M. W. BARSE & H. W. MOORE.
Drill Cable-Measure.
No. 197,080.   Patented Nov. 13, 1877.
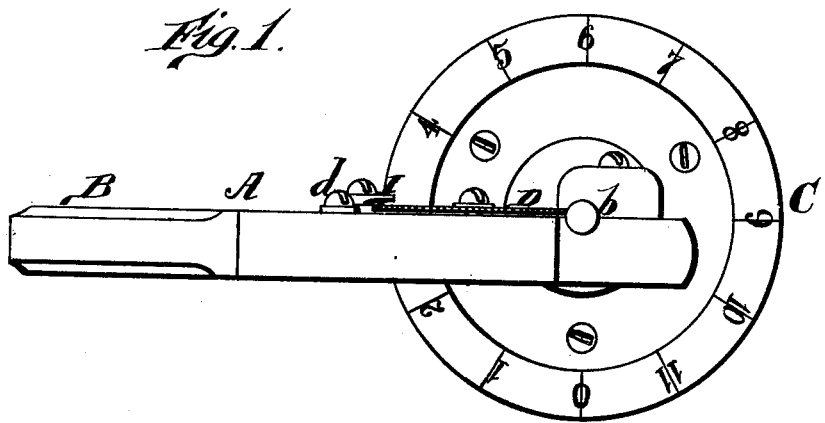
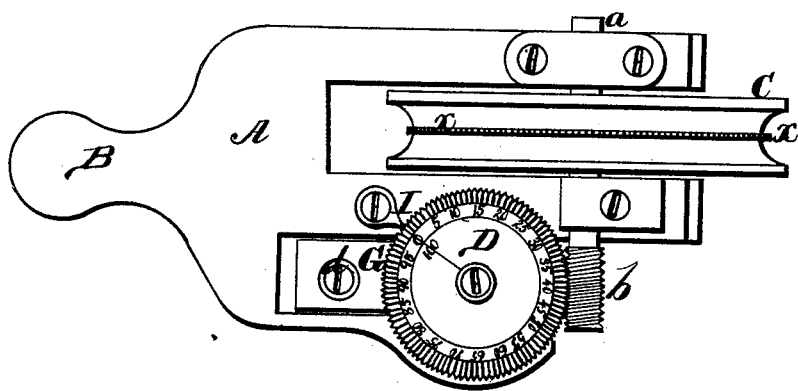

UNITED STATES PATENT OFFICE.

MILLS W. BARSE AND HOLLIS W. MOORE, OF OLEAN, NEW YORK.

IMPROVEMENT IN DRILL-CABLE MEASURES.

Specification forming part of Letters Patent No. 197,080, dated November 13, 1877; application filed July 21, 1877.

*To all whom it may concern:*

Be it known that we, MILLS W. BARSE and HOLLIS W. MOORE, of Olean, in the county of Cattaraugus and State of New York, have invented a new and valuable Improvement in Measuring Devices; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of our measuring device, and Fig. 2 is a front view of the same.

The nature of our invention consists in the construction and arrangement of a measuring device designed especially for measuring the depth of oil or Artesian wells during the process of drilling, as will be hereinafter more fully set forth.

The annexed drawings, to which reference is made, fully illustrate our invention.

A represents a slotted or forked frame, formed with a handle, B, as shown. In this frame is mounted a wheel, C, secured upon a shaft, $a$, which has its bearings in suitable boxes attached to the frame. The wheel C is grooved circumferentially, and in the bottom or center of this groove, all around the wheel, are formed teeth or serrations $x$ $x$.

One side of the wheel C is graduated or divided in twelve equal parts, measuring inches, the circumference of the wheel in the bottom of the groove being just one foot.

One end of the shaft $a$ is extended beyond its bearing, and formed or provided with a worm, $b$, which engages with a toothed wheel, D, pivoted centrally upon a slide, G, this slide being placed in a groove in the frame A, and held by a set-screw, $d$. The wheel D is graduated from 1 to 100, and has a corresponding number of teeth. I is the stationary index secured to the frame A.

When the drill is being raised out of the well, for the purpose of clearing the bottom of sand, the grooved serrated wheel C is held against the rope, which causes it to revolve and to communicate motion to the toothed wheel or dial D. The instrument having previously been set at zero, the length of the rope is thus measured and registered on the dial. The grooved wheel C being serrated, as described, prevents slipping while running on rope, and thus prevents erroneous measurement.

The slide G, which carries the toothed dial D, is adjustable out and in from the worm, so that by loosening the screw $d$ the dial is thrown out of the worm-thread, and can be quickly moved to any point desired for commencing measurement.

What we claim as new, and desire to secure by Letters Patent, is—

In a measuring device, the grooved operating-wheel C, having its face graduated, as set forth, and provided with serrations $x$, in combination with the prolonged shaft $a$, having the worm $b$, graduated toothed wheel D, centrally pivoted to the adjustable slide G, and index I, substantially as described, and for the purpose set forth.

In testimony that we claim the above we have hereunto subscribed our names in the presence of two witnesses.

MILLS W. BARSE.
HOLLIS W. MOORE.

Witnesses:
W. F. BURLINGHAM,
A. H. ABBEY.